(12) United States Patent
Jansen et al.

(10) Patent No.: US 7,815,536 B2
(45) Date of Patent: Oct. 19, 2010

(54) COMPACT GEARED DRIVE TRAIN

(75) Inventors: Patrick L. Jansen, Scotia, NY (US);
Gary R. Barnes, Delanson, NY (US);
Murtuza Lokhandwalla, Clifton Park, NY (US); Richard N. Dawson, Voorheesville, NY (US); Aniruddha D. Gadre, Rexford, NY (US); Ian A. Hughes, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 125 days.

(21) Appl. No.: 12/355,124

(22) Filed: Jan. 16, 2009

(65) Prior Publication Data

US 2010/0133854 A1    Jun. 3, 2010

(51) Int. Cl.
*F16H 57/04* (2010.01)
*F03D 9/00* (2006.01)

(52) U.S. Cl. .................................. 475/159; 290/55

(58) Field of Classification Search ................ 475/159, 475/160; 180/6.12; 290/44, 55, 1 C; 416/170 R; 74/467

See application file for complete search history.

(56) References Cited

U.S. PATENT DOCUMENTS

| | | | |
|---|---|---|---|
| 3,812,928 A * | 5/1974 | Rockwell et al. | 180/65.51 |
| 4,734,590 A * | 3/1988 | Fluegel | 290/1 C |
| 5,663,600 A | 9/1997 | Baek et al. | |
| 6,420,808 B1 | 7/2002 | Hosle | |
| 6,459,165 B1 | 10/2002 | Schoo | |
| 6,676,379 B2 * | 1/2004 | Eccles et al. | 416/170 R |
| 6,790,156 B2 * | 9/2004 | Hosle | 475/331 |
| 6,872,049 B2 | 3/2005 | Christensen | |
| 7,154,191 B2 | 12/2006 | Jansen et al. | |
| 7,154,193 B2 | 12/2006 | Jansen et al. | |
| 7,180,204 B2 | 2/2007 | Grant et al. | |
| 7,183,665 B2 * | 2/2007 | Bywaters et al. | 290/55 |
| 7,579,706 B2 * | 8/2009 | Siegfriedsen | 290/55 |
| 2006/0104815 A1 * | 5/2006 | Siegfriedsen | 416/170 R |
| 2006/0205557 A1 | 9/2006 | Arndt et al. | |
| 2007/0075548 A1 * | 4/2007 | Bagepalli et al. | 290/55 |
| 2010/0052442 A1 * | 3/2010 | Savant | 310/78 |
| 2010/0062888 A1 * | 3/2010 | Ciszak et al. | 475/31 |

FOREIGN PATENT DOCUMENTS

WO    2008113318 A2    9/2008

* cited by examiner

*Primary Examiner*—Roger Pang
(74) *Attorney, Agent, or Firm*—James W. Pemrick; Ernest G. Cusick; Frank A. Landgraff

(57) ABSTRACT

A drive train for a wind turbine is provided. The wind turbine includes a rotor connected to a low speed shaft, and a low speed shaft connected to a gearbox. The gearbox has a high speed shaft connected to a generator. The drive train includes a bearing interposed between the gearbox and the generator. A gearbox lubrication medium is at least partially contained within the gearbox, and the bearing shares the gearbox lubrication medium with the gearbox.

21 Claims, 5 Drawing Sheets

COMPACT GEARED DRIVE TRAIN

BACKGROUND OF THE INVENTION

The apparatus described herein relates generally to a compact drive train. More specifically, the apparatus relates to a compact geared drive train for a wind turbine.

Recently, wind turbines have received increased attention as environmentally safe and relatively inexpensive alternative energy sources. Wind turbines do not emit greenhouse gases (GHGs), and therefore, do not contribute to global warming. With the growing interest in wind generated electricity, considerable efforts have been made to develop wind turbines that are reliable and efficient.

Wind is usually considered to be a form of solar energy caused by uneven heating of the atmosphere by the sun, irregularities of the earth's surface, and rotation of the earth. Wind flow patterns are modified by the earth's terrain, bodies of water, and vegetation. The terms wind energy or wind power, describe the process by which the wind is used to rotate a shaft and subsequently generate mechanical power or electricity.

Typically, wind turbines are used to convert the kinetic energy in the wind into mechanical power. This mechanical energy may be used for specific tasks (such as grinding grain or pumping water) or a generator may convert this mechanical power (i.e., the rotation of a shaft) into electricity. A wind turbine usually includes an aerodynamic mechanism (e.g., blades) for converting the movement of air into a mechanical motion (e.g., rotation), which is then converted with a generator into electrical power. Power output from the generator is proportional to the cube of the wind speed. As wind speed doubles, the capacity of wind generators increases almost eightfold.

The majority of commercially available wind turbines utilize geared drive trains to connect the turbine blades to the electrical generators. The wind turns the turbine blades, which spin a low speed shaft, which feeds into a gearbox having a higher speed output shaft. This higher speed output shaft connects to a generator and makes electricity. The geared drive aims to increase the velocity of the mechanical motion.

The industry standard drive train for large (e.g., >1 MW) wind turbines consists of discrete gearbox and generator units that are separately mounted to a mainframe (also commonly called a bedframe or bedplate). Power is transferred from the gearbox to the generator via a flexible "high-speed" shaft coupling. This arrangement forces the gearbox and generator to be physically distanced from each other, as well as, requires both the output shaft of the gearbox and the input shaft of the generator to be separately supported by gearbox bearings and generator bearings, respectively.

BRIEF DESCRIPTION OF THE INVENTION

A drive train for a wind turbine is provided. The wind turbine includes a rotor connected to a low speed shaft, and a low speed shaft connected to a gearbox. The gearbox has a high speed shaft connected to a generator. The drive train includes a bearing interposed between the gearbox and the generator. A gearbox lubrication medium is at least partially contained within the gearbox, and the bearing shares the gearbox lubrication medium with the gearbox.

DETAILED DESCRIPTION OF THE INVENTION

Figure 1:
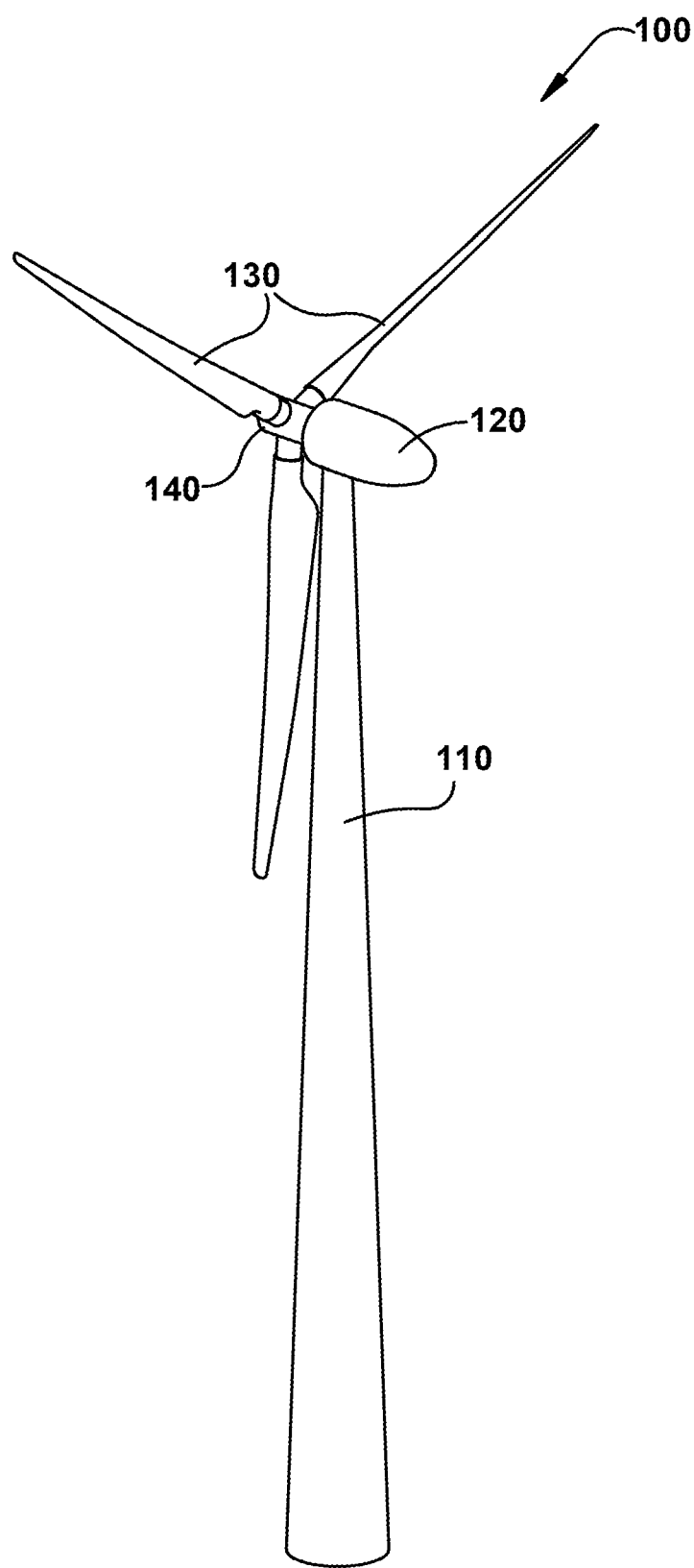
FIG. 1 is a perspective illustration of an exemplary wind turbine.

A typical commercial horizontal axis wind turbine (HAWT) 100 is illustrated in FIG. 1. The wind turbine 100 may include a tubular tower 110, which is often manufactured of steel. The tower 110 may be erected by stacking multiple tower segments on top of each other. The tower 110 supports the weight of the nacelle 120, blades 130 and hub 140. Towers may also be of the lattice (or truss) type, and tubular towers may alternatively be formed of concrete. The nacelle 120 typically houses the drive train (e.g., gearbox, shafts, couplings, generator, etc.), as well as the main frame (also called bedplate) and yaw drives. Other items such as the control electronics may be housed within the nacelle 120 as well. Typically, the nacelle 120 has an outer skin that is comprised of a lightweight material such as fiberglass or a graphite composite. The main function of the nacelle skin is to protect the contents from the elements (e.g., rain, ice, snow, etc.).

The blades 130 are connected to the hub 140, and the hub may contain a pitch control mechanism to control the pitch angle of each blade. Typically, three blades are employed in most commercial wind turbines, however, one, two or four or more blades could be employed as well. The blades convert the kinetic energy of the wind into mechanical energy by rotating a low speed shaft. Blades may be manufactured from fiberglass or graphite composites, fiberglass reinforced plastics or wood/epoxy laminates, or other suitable materials. The low speed shaft is connected to the hub 140 typically via a bolted flange coupling.

Generators are used to convert the rotation of a shaft into electrical energy. A gearbox is typically used to increase the speed of the input shaft to the generator. The gearbox has the low speed shaft as its input, and the output is a higher speed shaft, which according to aspects of the present invention, can feed directly into the generator.

Figure 2:
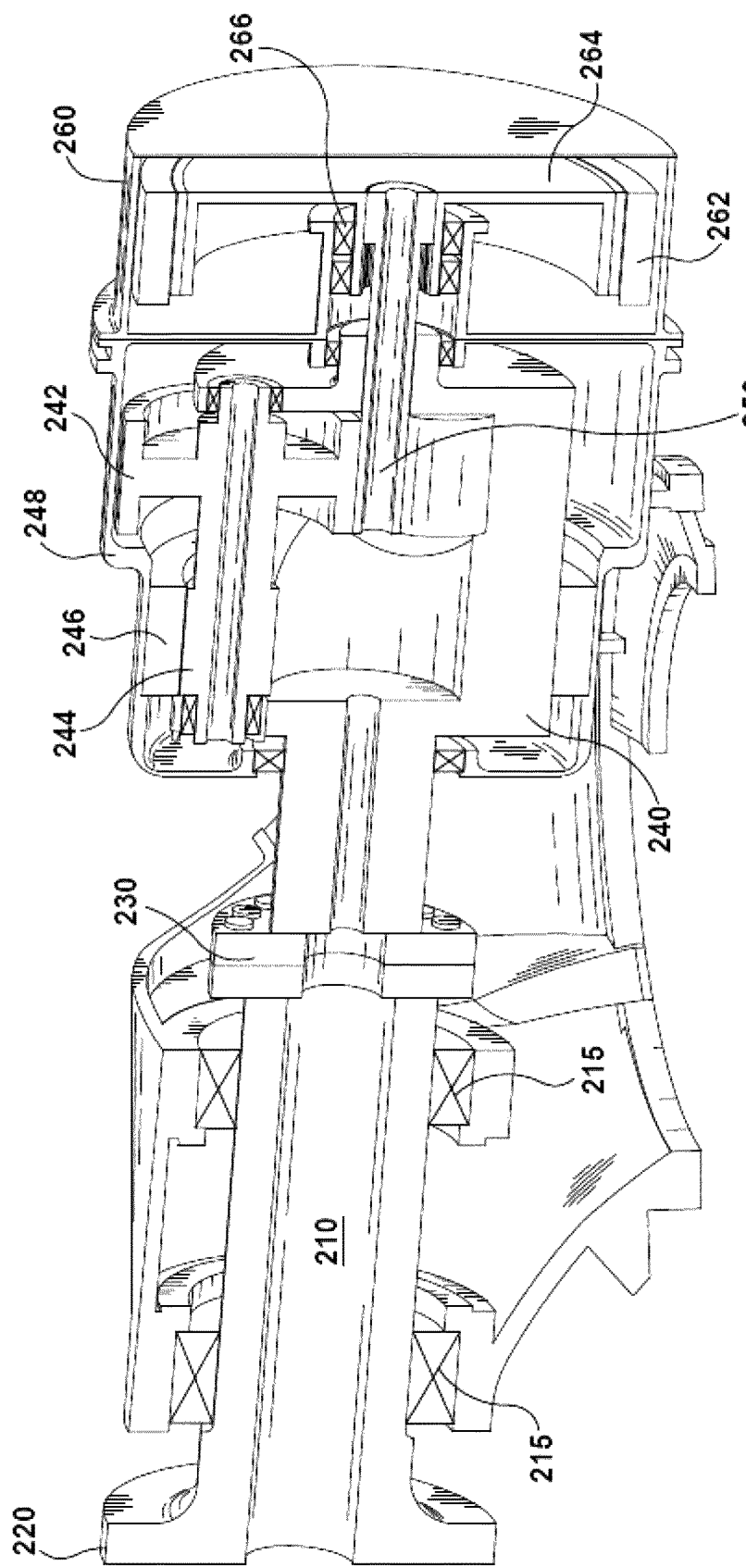
FIG. 2 is a partial, cut-away perspective illustration of one embodiment of a drive train that could be used in the wind turbine of FIG. 1.

FIG. 2 illustrates one known drive train comprising a compound planetary gearbox and generator. The low speed shaft 210 is supported by two separate and axially spaced main bearings 215. The low speed shaft 210 is connected via hub flange mount 220 to the hub 140 and blades 130 of wind turbine 100. Accordingly, low speed shaft 210 is driven by the wind turning blades 130. The low speed shaft 210 is connected to planet carrier 240 through a torque transmitting coupling 230. The planet carrier 240 supports the planet gears 242 and planet pinion gears 244, which share a common shaft. A ring gear 246 is fixedly attached to gearbox housing 248 and meshes with the planet pinion gears 244. A sun gear 250 is driven by the planet gears 242, and the output of the sun gear 250 is fed directly into generator 260.

The generator 260 has a stator 262 and a rotor 264. The rotor 264 is supported by rotor bearings 266, which are enclosed within the generator 260 A disadvantage to this design is that the rotor bearings 266 are isolated from the gearbox. If the rotor bearings need to be accessed, then the entire generator 260 must be removed. This can be a very time consuming and labor intensive process on a wind turbine installed at a remote location.

Figure 3:
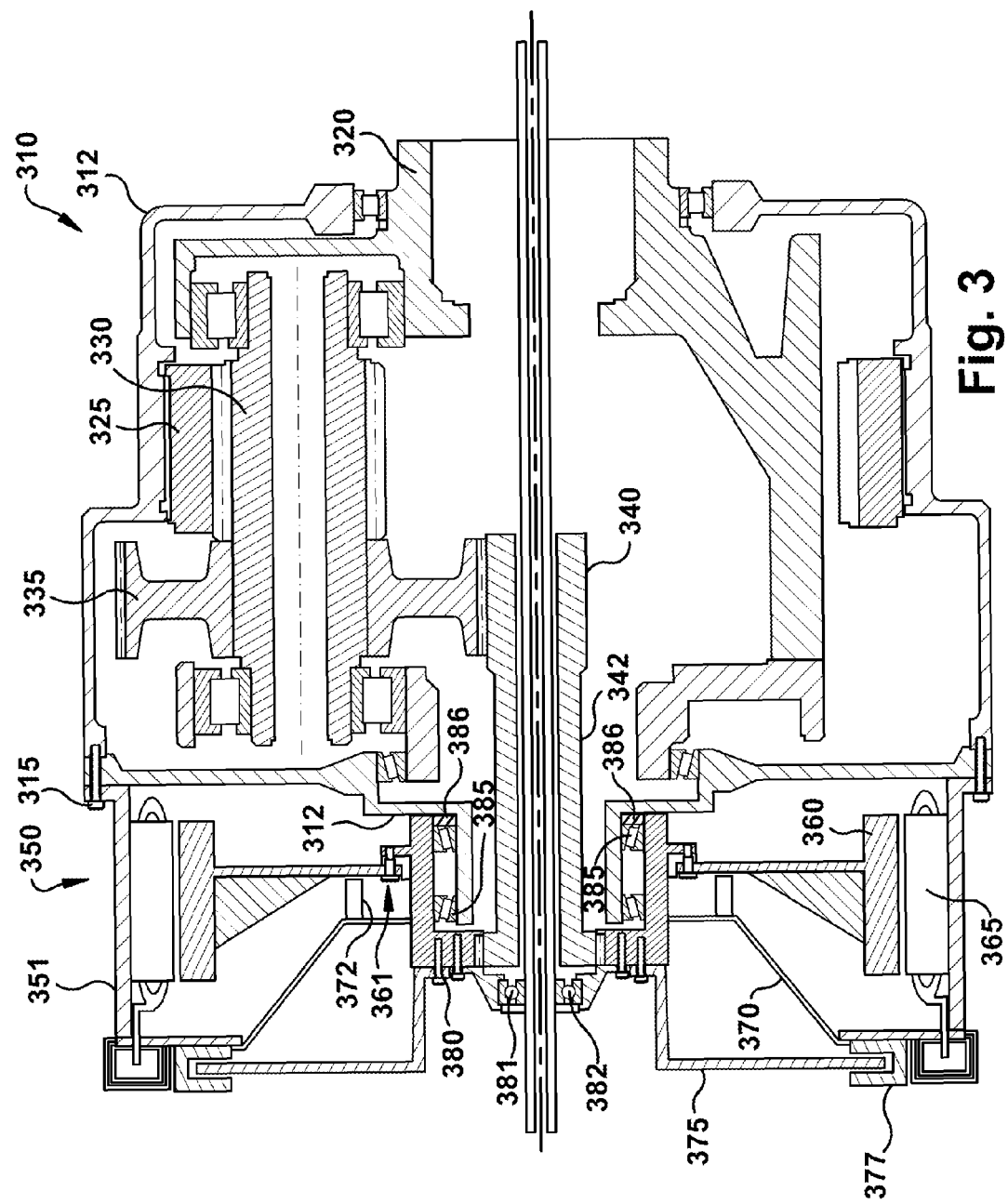
FIG. 3 is a partial, cut-away perspective illustration of another embodiment of a drive train that could be used in the wind turbine of FIG. 1.

FIG. 3 illustrates a cross-sectional view of a compact drive train according to aspects of the present invention. One main improvement is that the generator bearings are housed within the gearbox, allowing gearbox lubrication to reach the bearings, thereby eliminating the need for a separate lubrication system for the generator bearings. Another advantage is that the bearings can be accessed for maintenance without having to remove the generator.

A compound-planetary gearbox 310 is illustrated in FIG. 3, but it is to be understood that any suitable type of gearbox could be used with the present invention, including but not limited to planetary, dual-planetary, epicyclical and other types of gearboxes. The gearbox housing 312 is connected directly to a generator stator housing 351 via fasteners 315, or any other suitable fastening means. The gearbox 310 includes planet carrier 320, ring gear 325, planet pinion gears 330, planet gears 335 and sun gear 340.

The sun pinion shaft 342 is used as the mechanical input to the generator 350. The generator 350 includes rotor 360, and stator 365. As illustrated in FIG. 3, the generator rotor 360 is mounted on a rotating hub 380 via a flange mounting arrangement 361. The rotating hub 380 is tightly mounted over the outer race of rotor bearings 385, which are in turn tightly mounted over a tubular extension of gearbox housing 312. A seal unit 386, preferably of labyrinth type effectively spanning between the rotating hub 380 and gearbox housing 312, allows gearbox lubricant to lubricate the bearings 385 without leaking out of the gearbox.

The compact drive train includes a brake system to provide at least parking brake functionality for the wind turbine. The brake system as embodied in FIG. 3 comprises at least one brake disk 375 and one hydraulic brake caliper 377. The brake disk 375 is rigidly mounted to the rotating hub 380 and thus rotates at the same speed as the generator rotor 360. The brake caliper 377 is rigidly mounted to the generator stator housing 350 and thus is stationary. A generator shroud 370 is used to seal the generator from the brake disc 375 and the brake caliper 377. The compact drive train can readily accommodate other types of brake systems, including drum and shoe brake systems, as well as pneumatically actuated systems.

The sun gear 340, sun pinion shaft 342 and carrier 320 are hollow to accommodate a pitch tube 390 that carries control and power wiring for the wind turbine rotor hub pitch system controls. The pitch tube rotates at the same speed as the wind turbine rotor and the carrier 320, and is thus rigidly attached to the carrier 320 at its forward (upwind) end. The downwind or aft end of the pitch tube is supported by bearings 381 mounted in a housing, which is rigidly mounted to the rotating hub 380. A pitch tube seal 382, preferably of labyrinth type, prevents the gearbox lubricant from leaking out of the gearbox around the pitch tube.

The generator stator 365 is preferably electrically connected to a power electronic converter that controls and conditions the electrical power provided by the generator as supplied from the wind turbine to a power utility grid.

Flange mounting arrangement 361 (connecting rotor 360 to rotating hub 380) optionally contains an insulating layer and insulated bolts to provide electrical isolation between the rotor 360 and the rotating hub 380, thereby providing protection of the bearings 385 (and internal gearbox bearings) from damaging electrical currents created by the power electronic converter. The insulating layer material is preferably a glass-fiber reinforced polymer, such as G10 or G11.

An electrical grounding brush 372 provides a low-impedance grounding path between the rotor 360 and ground via stator shroud 370 and stator frame 351. The grounding brush provides an additional means of protecting the bearings 385 (and internal gearbox bearings) from damaging electrical currents by ensuring induced voltages at the rotor (and bearings) are below a desired threshold (e.g., about <2 volts).

Figure 4:
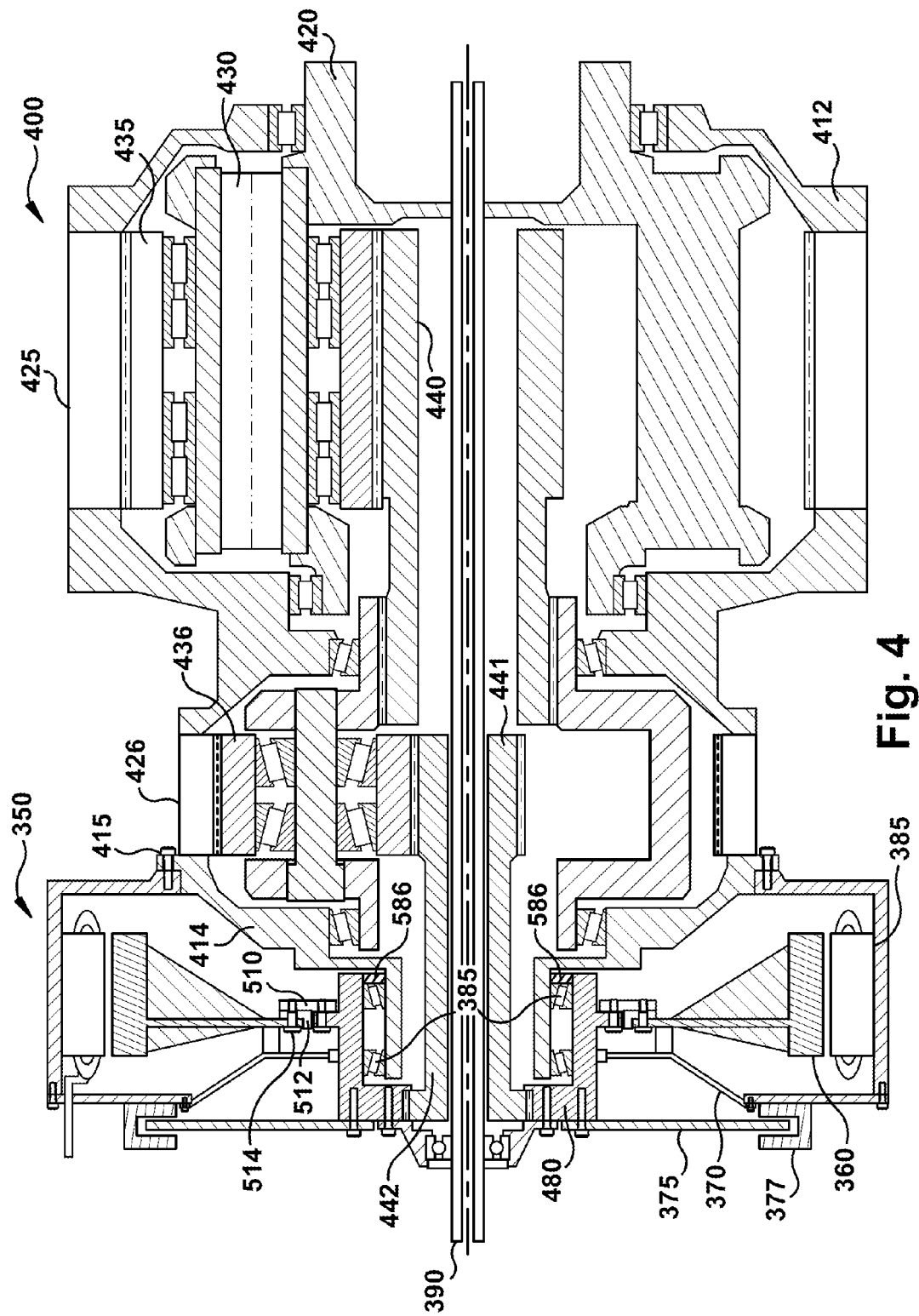
FIG. 4 is a partial, cut-away perspective illustration of yet another embodiment of a drive train that could be used in the wind turbine of FIG. 1

FIG. 4 illustrates a cross-sectional view of a compact drive train according to aspects of the present invention, employing a dual-planetary gearbox. The gearbox 400 is connected directly to generator 350 via fasteners 415. The gearbox 400 includes gearbox housing 412, planet carrier 420, ring gears 425 and 426, planet pinions 430, planet gears 435 and 436 and sun gears 440 and 441.

The second stage sun pinion shaft 442 is used as the input to the generator 350. The generator 350 includes rotor 360, and stator 365. A generator shroud 370 is used to seal the generator from the brake disc 375 and brake caliper 377. As illustrated in FIG. 4, the generator 350 is mounted on an inner hub 480, which is fixed and attached to the gearbox back plate 414 via fasteners 415. The rotor bearings 385 are placed between the inner hub 480 and an extension of gearbox backplate 414.

A number of advantages can be realized with the generator/gearbox configuration according to aspects of the present invention. The generator 350 is cantilevered off the back of the gearbox 310 (or 400), wherein the back of the gearbox is defined to be the high-speed shaft output end. The generator stator housing is mounted to gearbox back plate 312, 414 (e.g., via a bolted flange arrangement). The high-speed output of the gearbox is a rotating hub 380, 480 with rotor bearings 385. The rotor bearings 385 are mounted on an inner hub that is fixed and attached to gearbox back plate 312, 414. The generator rotor mounts to the rotating hub 380, 480 of the gearbox such that the "generator" bearings are fully contained within gearbox, thus sharing lube and cooling of the gearbox system. Seals 586 can help retain the gearbox lubrication medium within the interior of hub 480.

The sun gear shaft/pinion 342, 442 can connect to the rotating hub 380, 480 via a spline or gear-tooth connection allowing the sun gear to center itself between planet gears. The spline connection may include axial stops to accommodate axial thrust forces, especially due to helical gear meshes.

The generator rotor mounting can be via a flange mounting arrangement, and optionally has an insulating material (with insulated bolts, washers, etc.) sandwiched between the rotor and the rotating hub to provide electrical isolation between the generator rotor and all bearings in the drive train. As illustrated in FIG. 4, the generator rotor 360 connects to the rotating hub 480 via a dual flange coupling comprised of backing plate 510, optional insulator 512 and fasteners 514. The insulator 512 is sandwiched between the rotating hub 480 and the rotor 360 and can be comprised of any suitable electrically insulating material. For example, insulator 512 could be a glass reinforced polymer such as G10 or G11. The insulator 512 isolates the capacitively-coupled rotor voltages (e.g., produced from the power electronic converter) from the generator bearings and the remainder of the gearbox. The bearings 385 are protected from current damage by the incorporation of insulator 512.

A brake disk 375 mounts directly to rotating hub 380, 480 (e.g., via a bolted flange). At least one brake caliper 377 may mount to the generator housing and applies braking force to the brake disk 375 as needed.

Figure 5:
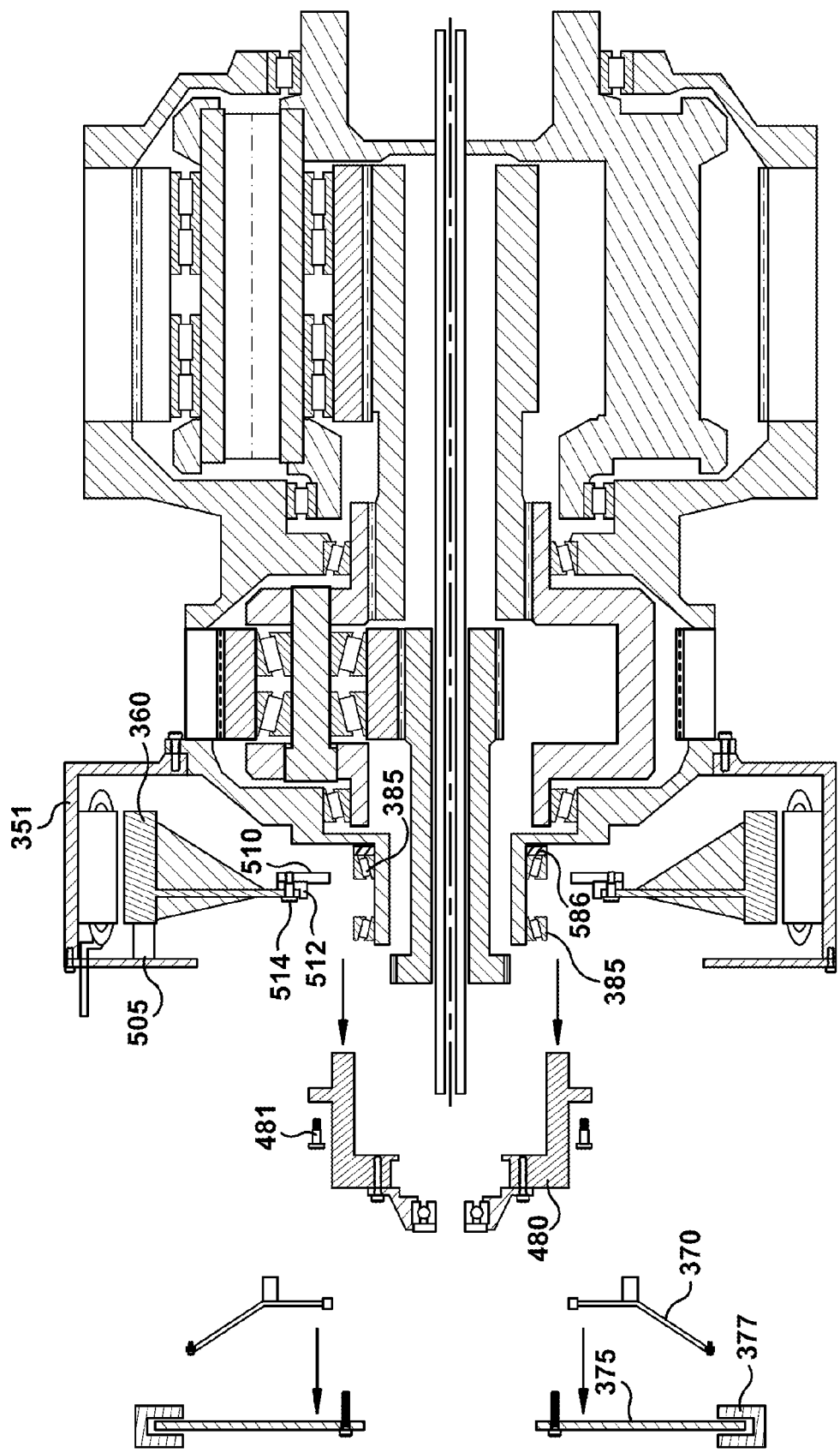
FIG. 5 is a partial, cut-away perspective illustration of the embodiment of FIG. 4 during servicing.

FIG. 5 illustrates an exploded cross-sectional illustration of the drive train of FIG. 4. During assembly and/or disassembly, the PM generator 350 is "bearingless", and the dual flange couplings enable generator bearing replacement without generator removal.

The brake disk 375 and brake caliper 377 can be removed. The generator shroud 370 can then be removed to permit access to hub 480. The rotor 360 and stator 365 can be rigidly connected to each other via bolted and/or clamped fixtures/spacers 505. The combined rotor and stator are then secured to the stator housing 351.

The hub 480 can be removed by removing fasteners 481 and bearing 385 retainer (not illustrated). The hub 480 can then be pulled off generator back plate 414 and bearings 385. The generator bearings 385 may now be replaced or repaired without having to remove the generator 350, rotor 360 or stator 365, thereby significantly reducing servicing costs.

An advantage of the cantilevered mounting and coupling arrangement is that it allows the generator and brake system to stay in-line with the gearbox even under extreme wind loads that cause the gearbox to deflect relative to a wind turbine bedplate and low-speed input shaft.

One preferred generator type is a PM synchronous generator, but induction generators, wound-field synchronous generators, or doubly-fed asynchronous generators could be used as well. A wind turbine employing a single generator has been described, but it is to be understood that multiple generators could also be used with modifications to the gearbox.

While various embodiments are described herein, it will be appreciated from the specification that various combinations of elements, variations or improvements therein may be made, and are within the scope of the invention.

What is claimed is:

1. A drive train for a wind turbine, said wind turbine comprising a rotor connected to a low speed shaft, the low speed shaft connected to a gearbox, said gearbox having a high speed shaft connected to a generator, the generator comprising a generator rotor and a stator, said drive train comprising:
    a bearing interposed between said gearbox and said generator;
    a hub mount connected to the generator and the bearing;
    a gearbox lubrication medium at least partially contained within said gearbox;
    wherein, said bearing shares said gearbox lubrication medium with said gearbox; and
    wherein the generator is connected to the hub mount with insulating fasteners, the insulating fasteners providing substantial electrical isolation between the generator rotor and the gearbox.

2. The drive train as defined in claim 1, wherein said generator is attached to a housing of said gearbox.

3. The drive train as defined in claim 2, wherein said generator is attached to said housing via a bolted flange connection.

4. The drive train as defined in claim 1, wherein said high speed shaft is connected to a rotating hub, said drive train further comprising:
    one or more bearings connected to at least a portion of a gearbox housing;
    wherein, said one or more bearings are interposed between said rotating hub and said gearbox housing.

5. The drive train as defined in claim 4, wherein said gearbox is configured as at least one of:
    planetary, dual-planetary, compound planetary, and epicyclical.

6. The drive train as defined in claim 5, wherein said gearbox comprises at least one sun gear and at least one sun shaft, said at least one sun shaft connected to said rotating hub.

7. The drive train as defined in claim 6, wherein said at least one sun shaft is connected to said rotating hub via, at least one of, a spline and gear-tooth connection.

8. The drive train as defined in claim 4, further comprising:
    a brake disk;
    wherein, said brake disk mounts directly to said rotating hub.

9. The drive train as defined in claim 4, wherein said one or more bearings may be serviced without removing said generator.

10. The drive train as defined in claim 4, further comprising:
    at least one seal disposed between said rotating hub and said gearbox housing;
    wherein, said at least one seal maintains the gearbox lubrication medium around said one or more bearings.

11. The drive train as defined in claim 4, further comprising:
    an insulating spacer disposed between a generator rotor and said rotating hub;
    wherein said insulating spacer isolates capacitively-coupled generator rotor voltages from said one or more bearings.

12. A drive train for a wind turbine, the wind turbine comprising a rotor connected to a low speed shaft, the low speed shaft connected to a gearbox, the gearbox having a high speed shaft connected to a generator, the high speed shaft connected to a rotating hub, the drive train comprising:
    a bearing interposed between the gearbox and the generator;
    a gearbox lubrication medium at least partially contained within the gearbox, the gearbox lubrication medium shared by the bearing and the gearbox;
    one or more bearings connected to at least a portion of a gearbox housing, the one or more bearings interposed between the rotating hub and the gearbox housing;
    an insulating spacer disposed between a generator rotor and the rotating hub;
    wherein, the insulating spacer isolates capacitively-coupled generator rotor voltages from the one or more bearings.

13. The drive train as defined in claim 12, wherein the generator is connected to a hub mount with insulating fasteners, the insulating fasteners providing substantial electrical isolation between the generator rotor and the gearbox.

14. The drive train as defined in claim 12, wherein the generator is attached to a housing of the gearbox.

15. The drive train as defined in claim 14, wherein the generator is attached to the housing via a bolted flange connection.

16. The drive train as defined in claim 12, wherein the gearbox is configured as at least one of:
    planetary, dual-planetary, compound planetary, and epicyclical.

17. The drive train as defined in claim 16, wherein the gearbox comprises at least one sun gear and at least one sun shaft, the at least one sun shaft connected to the rotating hub.

18. The drive train as defined in claim 17, wherein the at least one sun shaft is connected to the rotating hub via, at least one of, a spline and gear-tooth connection.

19. The drive train as defined in claim 12, further comprising:
    a brake disk;
    wherein, the brake disk mounts directly to the rotating hub.

20. The drive train as defined in claim 12, wherein the one or more bearings may be serviced without removing the generator.

21. The drive train as defined in claim 12, further comprising:
   at least one seal disposed between the rotating hub and the gearbox housing;
   wherein, the at least one seal maintains the gearbox lubrication medium around the one or more bearings.

* * * * *